US007079780B1

(12) United States Patent
Rollins (10) Patent No.: US 7,079,780 B1
(45) Date of Patent: Jul. 18, 2006

(54) LINEARIZED OPTICAL LINK USING A SINGLE MACH-ZEHNDER MODULATOR AND TWO OPTICAL CARRIERS

(75) Inventor: David L. Rollins, Hawthorne, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 09/322,283

(22) Filed: May 28, 1999

(51) Int. Cl.
*H04B 10/04* (2006.01)
*G02F 1/01* (2006.01)
(52) U.S. Cl. ..................... 398/198; 398/196; 398/195; 398/183; 359/239; 359/238
(58) Field of Classification Search .............. 359/181, 359/182, 183, 189, 237, 238, 239, 249; 398/182, 398/183, 195, 200, 118, 202
See application file for complete search history.

(56) References Cited

U.S. PATENT DOCUMENTS

| 5,031,235 | A |   | 7/1991  | Raskin et al.          |
|-----------|---|---|---------|------------------------|
| 5,119,447 | A |   | 6/1992  | Trisno ............... 385/3 |
| 5,227,857 | A |   | 7/1993  | Kersey ............ 356/345 |
| 5,257,124 | A | * | 10/1993 | Glaab et al. ........ 398/91 |
| 5,457,561 | A | * | 10/1995 | Taneya et al. ...... 398/120 |
| 5,654,814 | A | * | 8/1997  | Ouchi et al. ........ 398/196 |
| 5,661,582 | A | * | 8/1997  | Kintis et al. ........ 359/172 |

(Continued)

FOREIGN PATENT DOCUMENTS

WO    WO-00/18044 A    3/2000

OTHER PUBLICATIONS

"Linearization of a Broadband Analog Optical Link Using Multiple Wavelenghts", by E.I. Ackerman, International Topical Meetin On Microwave Photonics Technical Digest, Oct. 12-14, 1998, Sarnoff Corporation, Princeton, New Jersey, pp. 45-48.*

(Continued)

*Primary Examiner*—M. R. Sedighian
(74) *Attorney, Agent, or Firm*—Katten Muchin Rosenman LLP; John S. Paniaguas (57) ABSTRACT

An improved analog optical system which provides improved dynamic range as well as sensitivity relative to known analog optical systems. The analog optical system includes a Mach-Zehnder modulator (MZM) operated with a low bias to improve sensitivity. In accordance with an important aspect of the invention, the optical system utilizes two optical wavelengths with two effective bias points to cancel even ordered distortion associated with low biasing. Two lasers having different wavelengths are applied to the Mach-Zehnder modulator by way of a wavelength division multiplexer (WDM). Alternately, a single laser producing two optical carriers having different wavelengths could be used in place of the two single wavelength lasers and the WDM. The modulator bias control circuit forces two optical carriers to two bias points on opposite sides of the minimum bias point thus, providing equal modulation depth with opposite sign on each of the two optical carriers. The frequency separation of the two optical carriers, together with the nominal optical path length difference between the two arms of the Mach-Zehnder modulator determines the degree of low biasing achieved and thus the resulting potential for improvement in sensitivity and third-order linearity. The receiver or demodulator also includes a WDM to separate the two wavelengths which, in turn, are applied to two separate photodetectors allowing each wavelength to be detected separately. The complementary photocurrents are subtracted with a balanced photodetector pair to provide a linearized RF output.

7 Claims, 6 Drawing Sheets

U.S. PATENT DOCUMENTS

| | | | | |
|---|---|---|---|---|
| 5,864,625 | A | * | 1/1999 | Rutledge ..................... 380/31 |
| 5,870,216 | A | | 2/1999 | Brock et al. ................. 359/172 |
| 5,880,870 | A | * | 3/1999 | Sieben et al. ............... 398/183 |
| 5,917,179 | A | * | 6/1999 | Yao ........................ 250/227.11 |
| 5,917,638 | A | * | 6/1999 | Franck et al. ............... 398/201 |
| 5,917,970 | A | * | 6/1999 | Burns et al. ................. 385/24 |
| 5,940,196 | A | * | 8/1999 | Piehler et al. ............... 398/91 |
| 5,953,139 | A | * | 9/1999 | Nemecek et al. ............. 398/79 |
| 5,995,256 | A | * | 11/1999 | Fee ............................ 359/125 |
| 6,163,394 | A | * | 12/2000 | Webb ......................... 398/185 |
| 6,163,395 | A | | 12/2000 | Nemecek et al. .......... 398/198 |
| 6,188,497 | B1 | * | 2/2001 | Franck et al. ............... 359/181 |
| 6,229,632 | B1 | * | 5/2001 | Jabr .......................... 398/183 |
| 6,252,692 | B1 | * | 6/2001 | Roberts ...................... 398/147 |
| 6,271,953 | B1 | * | 8/2001 | Dishman et al. ............ 359/172 |

OTHER PUBLICATIONS

"Multi-Octave Operation of Low-Biased Modulators by Balanced Detection", by W.K. Burns, Senior Member, IEEE, G.K. Gopalakrishnan, Member, IEEE, and R.P. Moeller. Ieee Photonics Technology Letters, vol. 8, No. 1, Jan. 1996.

"Spur-Free Dynamic Range Measurements of a Fiber Optic Link with Traveling Wave Linearized Directional Coupler Modulators", by Schaffner, et al., IEEE Photonics Letters, vol. 6, No. 2, Feb. 1994, pp. 273-275.

"Linearization of a Broadband Analog Optical Link Using Multiple Wavelengths", by E.I. Ackerman, International Topical Meeting on Microwave Photonics Technical Digest, Oct. 12-14, 1998, Sarnoff Corporation, Princeton, New Jersey, pp. 45-48.

* cited by examiner

LINEARIZED OPTICAL LINK USING A SINGLE MACH-ZEHNDER MODULATOR AND TWO OPTICAL CARRIERS

BACKGROUND OF THE INVENTION

1. Field of the Invention

The present invention relates to an optical modulation system for modulating RF signals onto an optical carrier and more particularly to a Mach-Zehnder optical modulator (MZM) which utilizes two lasers with two optical wavelengths with two corresponding bias points to provide relatively improved performance relative to known optical modulators.

2. Description of the Prior Art

Figure 2:
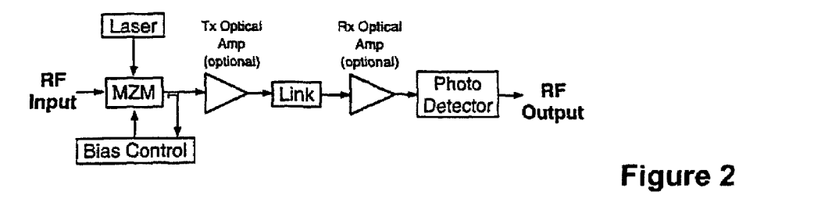
FIG. 2 is a block diagram of a known analog optical system utilizing a Mach-Zehnder modulator with a single laser as illustrated in FIG. 1.
Figure 3:
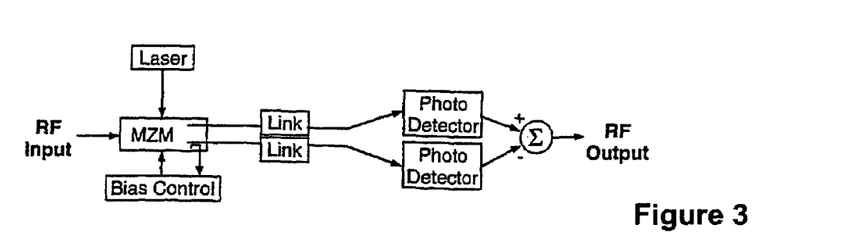
FIG. 3 is a block diagram of another known analog optical system which includes a known complementary output Mach-Zehnder modulator and a balanced detector.

Analog optical links are generally known in the art. Such analog optical links are used in optical communications systems, particularly those systems which require bandwidth efficiency. An example of such a system is cable television (CATV) system. In such systems, a number of video channels are known to be transmitted through optical fibers. As such, RF video signals are modulated onto an optical carrier by way of an optical modulator. Various analog optical systems are known in the art. Other examples of known analog optical systems are illustrated in FIGS. 2 and 3. In particular, such analog optical systems may include a Mach Zehnder optical modulator and one or more photodetectors as shown in FIGS. 2 and 3. In particular, the system illustrated in FIG. 2 illustrates a basic Mach Zehnder based optical link while FIG. 3 illustrates a known analog optical link which includes a known complementary output Mach-Zehnder modulator and a balanced detector.

Such optical modulators are based upon the electro-optic affect. More particularly, certain materials, such as lithium niobate (LiNdO$_3$), change properties, such as a refractive index, as a function of an applied electric field. This variance in the refractive index causes phase modulation of the light propagating through the material. This phase modulation of the optical carrier signal can be converted to optical intensity modulation by various optical devices including a Mach-Zehnder interferometer.

Figure 1:
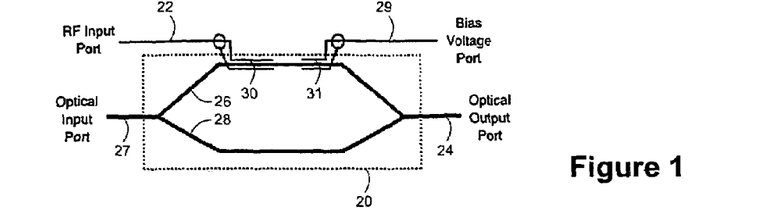
FIG. 1 is block diagram of a known Mach-Zehnder modulator.

An exemplary Mach-Zehnder modulator is illustrated in FIG. 1. As shown in FIG. 1, the Mach-Zehnder modulator, generally identified with the reference numeral 20, includes an RF input port 22, an optical output port 24, two optical waveguides 26 and 28, an optical carrier input port 27 and a bias voltage port 29. In general, an optical carrier, such as a laser beam, is applied to the input port 27 and split into two paths defined by legs or waveguides 26 and 28. At least one of the legs 26, 28 is phase modulated by an RF input signal, applied to an RF electrode 30. The two legs 26, 28 are then recombined in an interferometer to provide an intensity modulated optical carrier at the output port 24. A bias voltage is also applied to the bias electrode 31 to control the bias intensity at the optical output port 24. The optical path length difference of the legs 26, 28 is a function of the physical path length and effective path length changes due to applied voltages (bias voltage plus small signal voltage) which change the relative index of refraction of the legs 26, 28.

Ideally an optical intensity modulator should have a linear relationship between its output optical power and the RF input voltage. As is known in the art, the output power curve of a Mach-Zehnder modulator is non-linear. Linearity and spur free dynamic range (SFDR) are important considerations in links using such modulators. The SFDR is the ratio of the largest to smallest signal power that the link can transmit and receive with a positive signal-to-noise ratio without introducing distortion (spurs) visible above the noise floor, as generally discussed in "Spur-Free Dynamic Range Measurements of a Fiber Optic Link with Traveling Wave Linearized Directional Coupler Modulators," by Schaffner, et al. *IEEE Photonics Letters*, Vol. 6, No. 2, February 1994, pages 273–275, hereby incorporated by reference. Thus, many known linearization schemes for such systems are known to significantly degrade the link sensitivity to improve the SFDR. The sensitivity of simple lossy links can be improved by either lowering the switching voltage and/or using higher power optical amplifiers in the transmitter to get more optical power at the receiver's optical pre-amplifier input. For links requiring multiple optical amplifiers distributed along a long fiber optic channel or in a series of free space channels, the sensitivity can be improved by using higher power optical amplifiers or increasing the number of amplifiers and reducing their spacing in the channel(s). The sensitivity of links can also be improved by low biasing the modulator which results in a better relative small signal link gain with a fixed photo current.

Many known linearization schemes for Mach-Zehnder based links require at least two modulators requiring power splitting of the RF signal between the modulators. An example of such a system is disclosed in "Multi-Octave Operation of a Low Biased Modulator by Balanced Detection" by W. K. Burns, et al. *IEEE Photonics Technology Letters*, vol. 8, no. 1, January 1996, pages 130–132. Unfortunately, the degree of linearization in such configurations is highly dependent on the accuracy of the RF splitting ratios. Also, in such configurations, the SFDR is improved at the expense of sensitivity which increases the linearity requirements on the RF amp driving the Mach-Zehnder modulator.

Another approach to linearizing a Mach-Zehnder modulator is disclosed in U.S. Pat. No. 5,119,447. In particular, the '447 patent discloses a Mach-Zehnder modulator serially combined with a directional coupler. The Mach-Zehnder modulator is modulated by way of a pair of electrodes at a first polarity. The modulating signal is applied to a second pair of electrodes for the directional coupler and modulated at a second polarity opposite of the first polarity. Unfortunately, this system requires relatively precise RF power splitting between two or more electrodes in a combination Mach-Zehnder and directional coupler with a single laser. Thus, there is a need for a relatively linear Mach-Zehnder modulator which requires no RF power splitting. The sensitivity of this modulator is also degraded by over 6 dB.

SUMMARY OF THE INVENTION

Briefly, the present invention relates to an improved analog optical system which provides improved dynamic range as well as sensitivity relative to known analog optical systems. The analog optical system includes a Mach-Zehnder modulator (MZM) operated with a low bias to improve sensitivity. In accordance with an important aspect of the invention, the optical system utilizes two optical wavelengths with two effective bias points to cancel even ordered distortion associated with low biasing. Two lasers having different wavelengths are applied to the Mach-Zehnder modulator by way of a wavelength division multiplexer (WDM). Alternately, a single laser producing two optical carriers having different wavelengths could be used in place of the two single wavelength lasers and the WDM. The modulator bias control circuit forces the two optical carriers to two bias points on opposite sides of the minimum bias point thus, providing equal modulation depth with opposite sign on each of the two optical carriers. The frequency separation of the two optical carriers, together with the nominal optical path length difference between the two arms of the Mach-Zehnder modulator determines the degree of low biasing achieved and thus the resulting potential for improvement in sensitivity and third-order linearity. The receiver or demodulator also includes a WDM to separate the two wavelengths which, in turn, are applied to two separate photodetectors allowing each wavelength to be detected separately. The complementary photocurrents are subtracted with a balanced photodetector pair to provide a linearized RF output.

DESCRIPTION OF THE DRAWINGS

These and other objects of the present invention will be readily understood with reference to the following specification and attached drawing wherein.

DETAILED DESCRIPTION

The present invention relates to an analog optical link which provides improved dynamic range as well as sensitivity. The analog optical link in accordance with the present invention includes a Mach-Zehnder optical modulator, for example as illustrated in FIG. 1. In accordance with an important aspect of the invention, the Mach-Zehnder modulator is operated at low bias points in order to improve the sensitivity and at the same time uses two optical carriers having different wavelengths with two effective bias points to cancel even ordered distortion associated with low biasing. The bias control circuit forces the two wavelengths to simultaneously bias the modulator at two bias points on opposite sides of the minimum bias point which provides equal gains with opposite signs.

Figure 4:
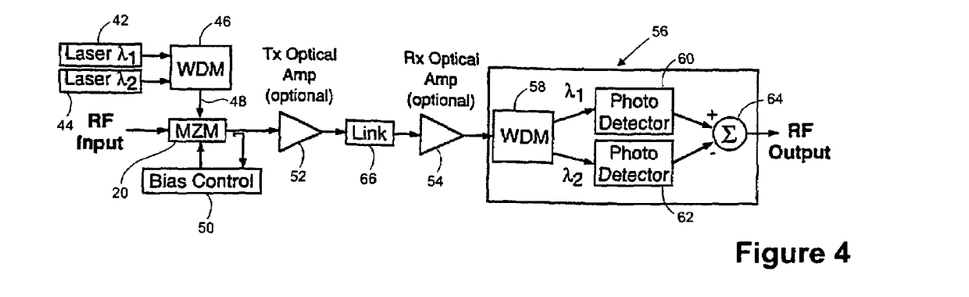
FIG. 4 is a block diagram of an analog optical link in accordance with the present invention.

As illustrated in FIG. 4, the wavelengths may be provided by two separate lasers 42 and 44 which provide separate optical carriers. The lasers 42 and 44 are equal power lasers with different wavelengths $\lambda_1$, $\lambda_2$ and are combined by way of the wavelength division multiplexer (WDM) 46 having two input ports and one output port onto a single fiber or wave guide 48. Alternately, a single laser producing two optical carriers having different wavelengths could be used in place of the two single wavelength lasers and the WDM. The combined wavelengths are modulated with an RF input signal by way of the Mach-Zehnder modulator 20. As will be discussed in more detail below, a bias control circuit 50 is provided which biases the Mach-Zehnder modulator 20 at a low bias point such that the two wavelengths have complementary small signal gains. The modulated optical signal, available at the output of the Mach-Zehnder modulator 20, may optionally be amplified with an optical amplifier 52. The lasers 42, 44, Mach-Zehnder modulator 20, bias control circuit 50, WDM 46 and optical amplifier 52 form a transmitter portion of the optical link in accordance with the present invention.

The optical system in accordance with the present invention also includes a receiver portion which includes an optional optical amp 54 and a demodulator 56. The demodulator 56 includes a wavelength division multiplexer (WDM) 58, a pair of photodetectors 60, 62 and a summing junction 64. The received signal is optically amplified by way of the optical amplifier 54 and demultiplexed by another WDM 58 to produce separate wavelengths $\lambda_1$, and $\lambda_2$. Each wavelength $\lambda_1$, $\lambda_2$ is photodetected separately by the photodetectors 60 and 62, respectively. These photodetectors 60, 62 provide complementary (i.e. equal gain different sign) photo currents which are subtracted by way of the summing junction 64 in order to provide a linearized RF output. Alternatively, the two photodetector outputs could be combined with a differential amplifier or a 180° hybrid coupler or any other device that combines the two signals 180° out of phase.

The optical transmitter and optical receiver in accordance with the present invention are coupled by an optical link 66. The optical link 66 may be a fiber optic cable or waveguide based optic link or an optical link in which the modulated optical signal is transmitted in free space. Both of such embodiments are considered to be within the scope of the present invention. The optical link 66 could also include additional optical amplifiers distributed along the link to overcome large link losses and prevent the optical signal power from dropping too low.

Figure 5:
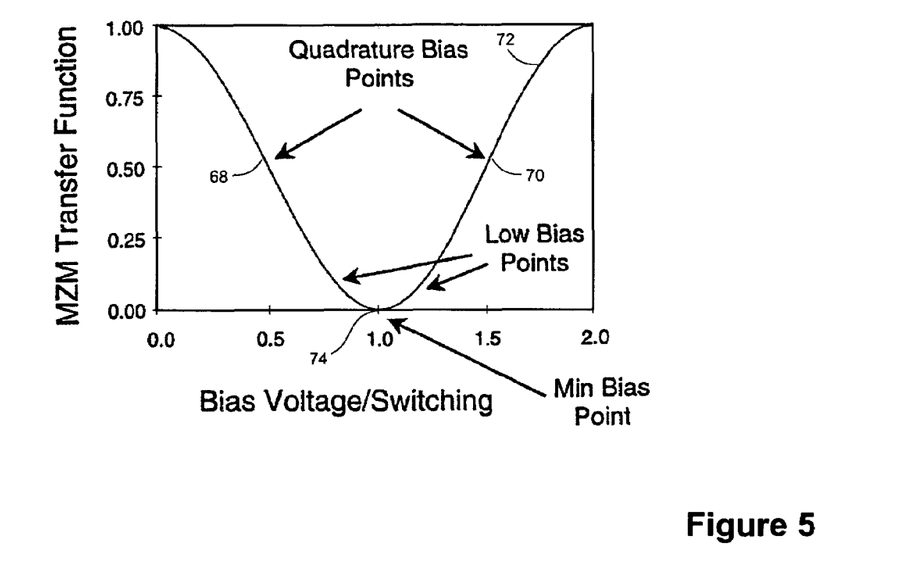
FIG. 5 is a graphical illustration of the transfer function of the Mach-Zehnder modulator as a function of the bias voltage.

As used herein, low bias is defined with reference to FIG. 5 to be a range between the quadrature bias points as indicated by the points 68 and 70 on the curve 72 and the minimum bias point indicated by the point 74. As shown, the transfer function of the Mach-Zehnder modulator 20 is a raised cosine function. In other words, unlike a cosine function in which the average value is 0, as seen in FIG. 5, the average value is approximately 0.5, depending on the modulator's extinction ratio.

The Mach-Zehnder modulator 20 works on the principle of coherent interference. As discussed above, the optical input power is equally split into two arms or waveguides. The relative path lengths of these two arms can be changed. When the pathlengths are equal or differ by a multiple of the optical wavelengths, they add coherently at the output which gives maximum optical transmission. When the pathlengths differ by a multiple of the optical wavelength plus a half wavelength, they coherently cancel at the output which gives minimum optical transmission. At points in between, the signals partially cancel.

The optical pathlength difference is determined by the combination of physical path lengths plus the effective path length changes due to applied voltages, such as the bias voltage and the RF signal voltage, which change the relative index of refraction on the two arms of the modulator. For a roughly fixed optical pathlength difference, the degree of low biasing can be continuously adjusted by increasing or decreasing the wavelength separation of the lasers.

Figure 6A:
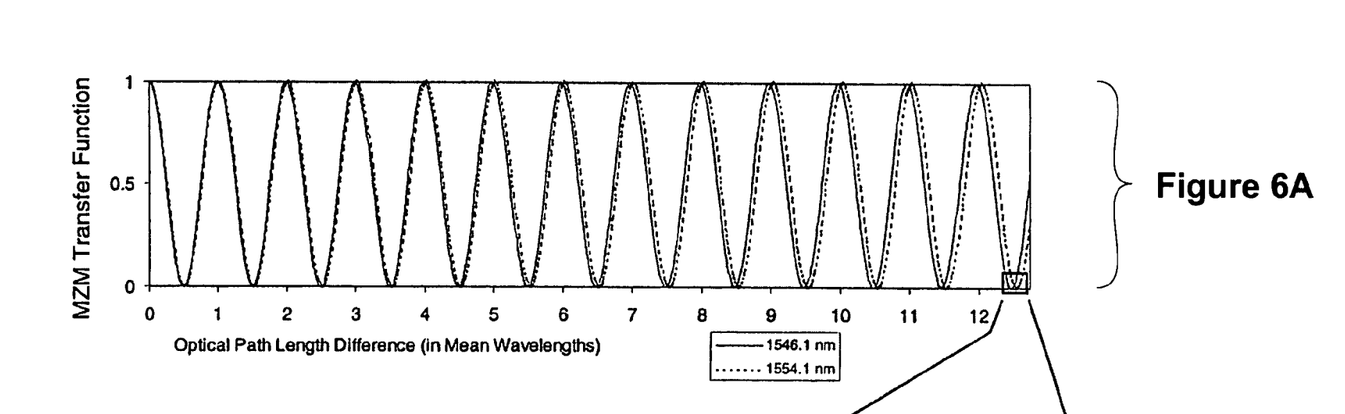
FIG. 6A is a graphical illustration of the transfer function of a Mach-Zehnder modulator according to the present invention as a function of optical pathlength differences in wavelengths.
Figure 6B:
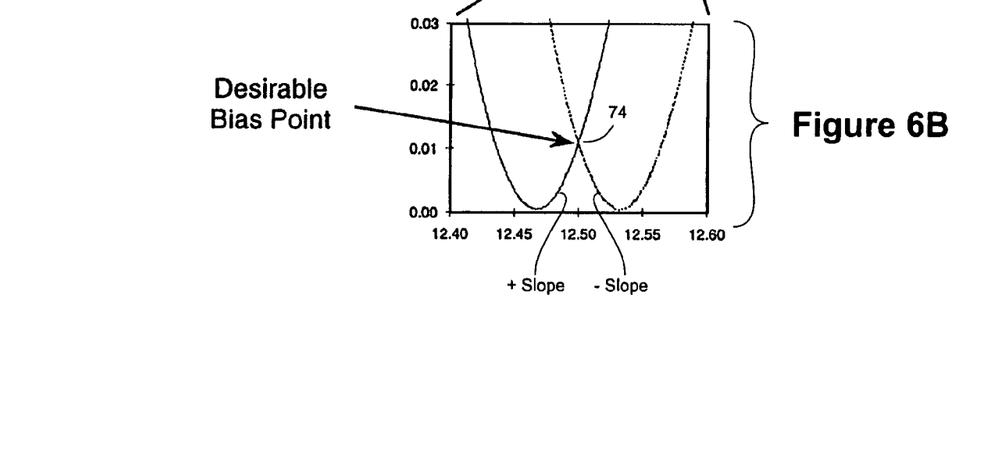
FIG. 6B is a magnified view of a portion of the transfer function illustrated in FIG. 6A which illustrates the desired bias point of the Mach-Zehnder modulator in accordance with the present invention.

The transfer function for a Mach-Zehnder modulator operated at two wavelengths in accordance with the present invention is illustrated in FIG. 6A. As shown, the wavelengths are 1546.1 nm as shown in solid line and 1554.1 nm, as shown in the dotted line. As shown in FIG. 6A, the difference in wavelengths provides a slight phase separation of the cosine transfer functions associated with each of the wavelengths $\lambda_1$, $\lambda_2$. In order to make up for the relatively poor linearity at the low bias point, the system in accordance with the present invention is operated at a bias point indicated by the point 74. The point 74 is at a point where both wavelengths $\lambda_1$, $\lambda_2$ have approximately equal input power but opposite slope. As shown, at the desired bias point 74, the slope of the transfer function for one wavelength will be positive while the slope at the other wavelength will be negative as indicated in FIG. 6B.

Figure 7:
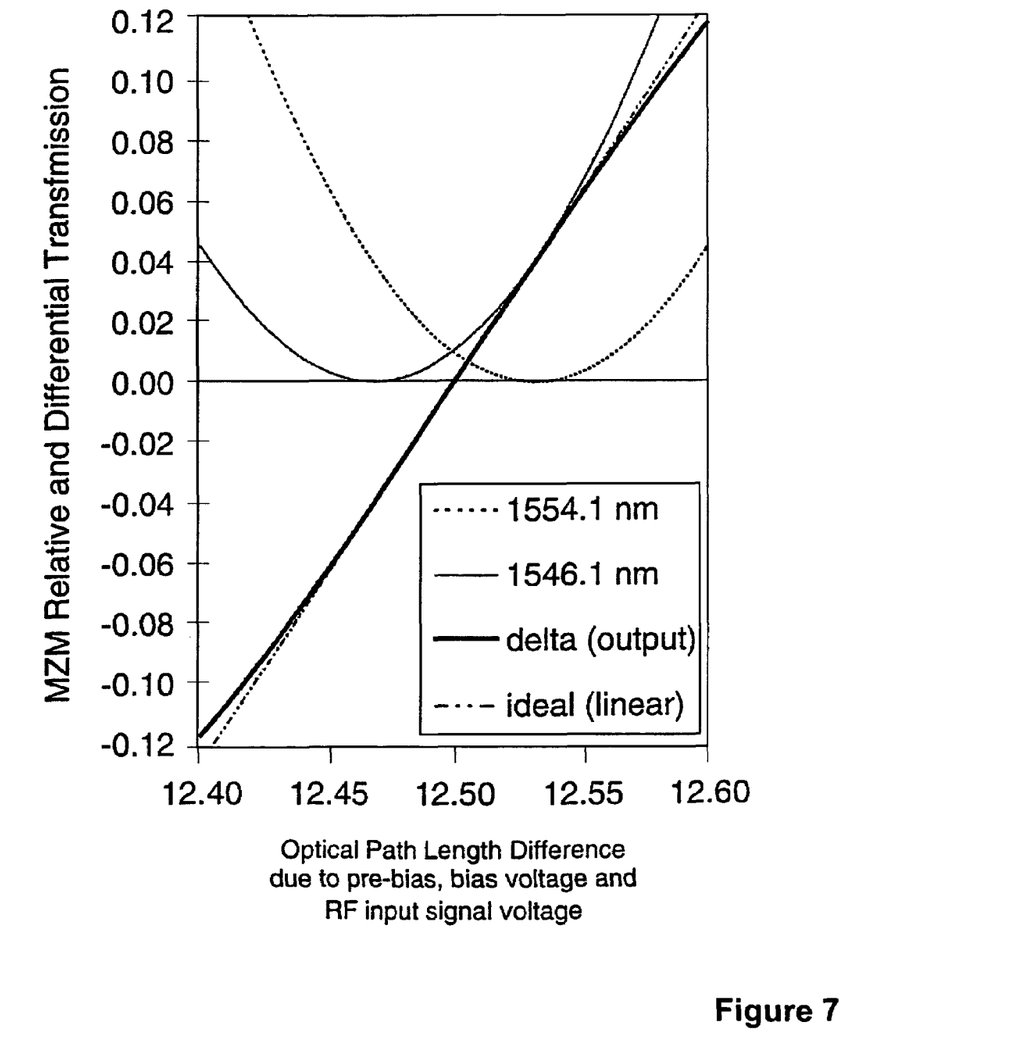
FIG. 7 is a graphical illustration of a relative and differential transmission of a Mach-Zehnder modulator in accordance with the present invention as a function of the optical pathlength difference due to pre-bias, bias voltage and RF voltage signal.
Figure 9:
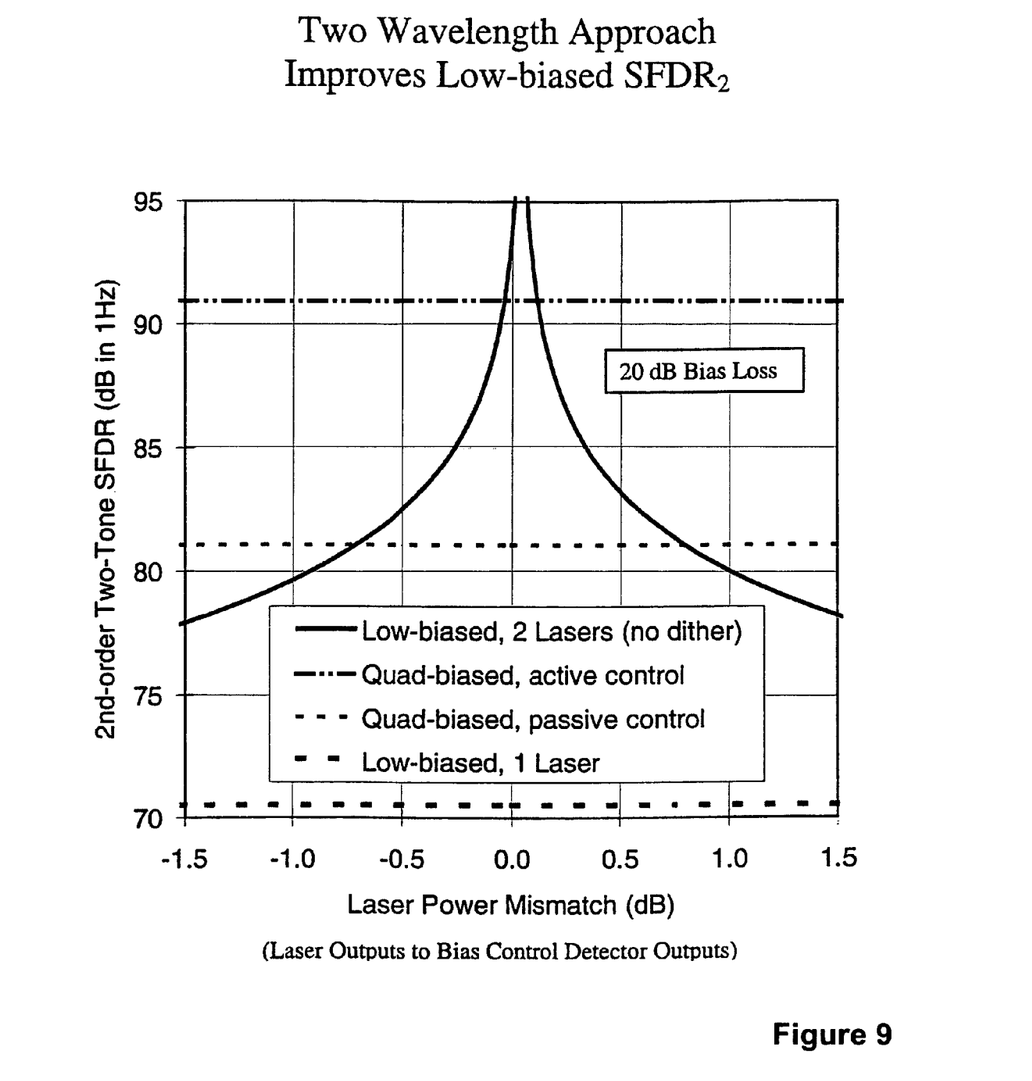
FIG. 9 is a graphical illustration of the second order two-tone SFDR as a function of the laser power mismatch.

FIG. 7 shows the benefits of the dual wavelength low bias optical link. As shown a small signal voltage (i.e. RF input signal) can swing the transfer function of the Mach-Zehnder modulator way past the minimum bias point before the link linearity has significantly degraded. The degree of cancellation of the even ordered distortions is a function of the relative matching of the optical power of the two wavelengths and their losses to the transmitter's coupled balanced detectors. Because the two wavelengths have slightly different switching voltages, the optimal laser power ratio to null even ordered distortion is not exactly one (0 dB) as shown in FIG. 9. However, the calibration mismatch from 0 dB is usually smaller than the calibration accuracy.

Figure 8:
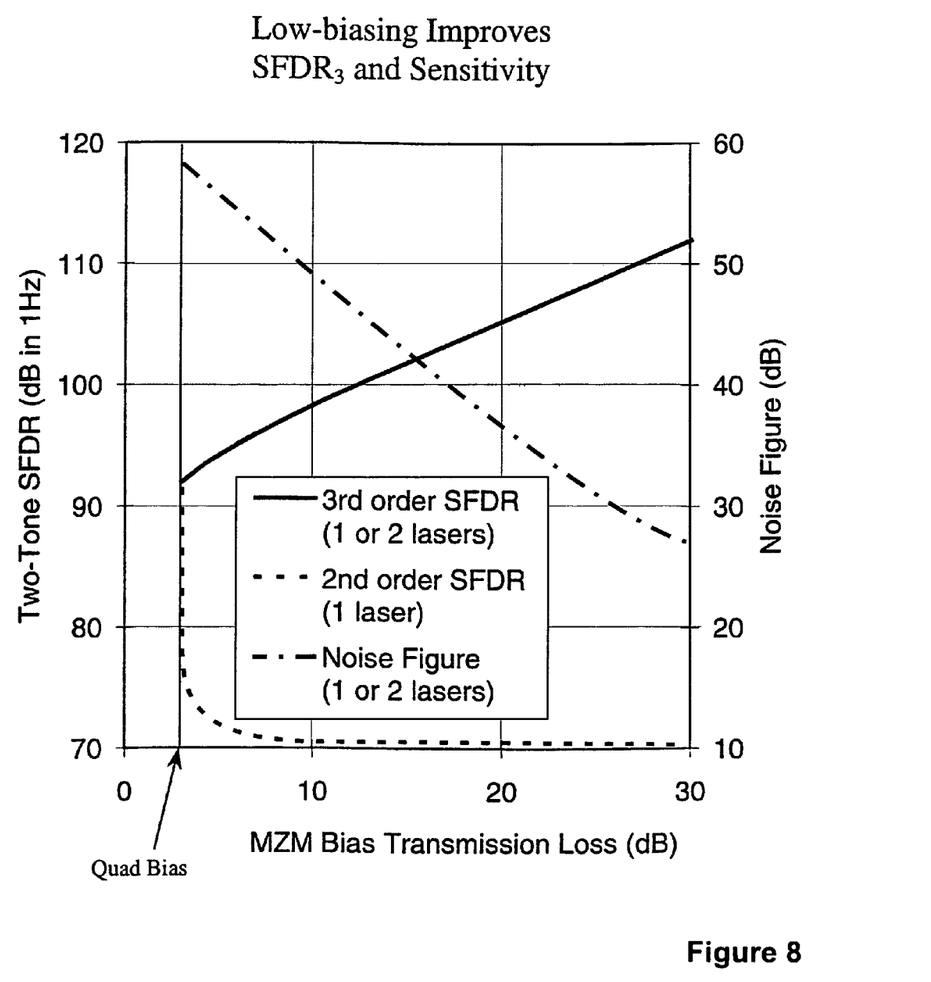
FIG. 8 is a graphical illustration of the third order two-tone spur-free dynamic range (SFDR) as a function of the biased transmission loss of the Mach-Zehnder modulator in accordance with the present invention.

FIGS. 8 and 9 show a comparison between single and dual wavelength Mach-Zehnder modulator based optical links. In particular, FIG. 8 shows a single wavelength link performance as a function of the degree of low biasing. The x-axis is expressed in terms of modulator optical insertion (transmission) loss due to low biasing. As shown, even with a single wavelength, the lower the biasing the better the sensitivity and the third order SFDR (assuming sufficient laser power, such that the modulator optical insertion loss does not degrade the link sensitivity). However, the second order SFDR degrades quickly as the biasing drops below quadrature (3 dB bias transmission loss). As shown in FIG. 9, the dual wavelength low biased link in accordance with the present invention with a laser power mismatch of less than 0.75 dB has better second order SFDR than a typical commercial quadrature biased link with passive bias control to maintain the quadrature bias.

By choosing the bias points with opposite slopes, the output of the Mach-Zehnder modulator in accordance with the present invention will have equal modulation depth for each of the wavelengths but opposite signs. The receiver separates the two wavelengths by way of the WPM 58 (FIG. 4). Due to the opposite signs, the summing junction 64 sums the fundamental signals coherently since their gains have opposite signs and cancels even ordered distortion since they have the same amplitude but different signs. The photodetectors 60 and 62 and summing junction 64 thus form a balanced photodetector which essentially linearizes the optical length.

The bias control circuit 50 in accordance with the present invention is a low frequency copy of the demodulator 56 and thus includes a WDM, (not shown) a pair of photodetectors and a summing junction (not shown). The bias control circuit 50 is relatively simple compared to known devices and does not require dithering. In particular, bias control circuit 50 is coupled to the output of the Mach-Zehnder modulator. The DC bias voltage is adjusted in order to null the differential photocurrent. The optical losses from the laser sources to the bias control's photodetector outputs are calibrated so that the lasers 42 and 44 must only control their own output power. Optical gain variations in the optical amplifiers are automatically compensated for in the demodulator 56 which adjusts the relative photocurrents to null the differential DC photocurrents.

For very high performance links requiring even better even order linearity, active bias control can be used by injecting a low frequency dither (e.g. a small 1 kHz tone not shown) into the Mach-Zehnder modulator bias voltage. In this embodiment, the receiver adjusts the relative photocurrents into the summing junction 64 in order to null the dither's second harmonic instead of the DC photocurrent with a lock-in amplifier. The photocurrents can be adjusted either by adjustable optical attenuators before each photodetector 60, 62 or by adjustable current dividers before the summing junction 64. The receiver must also detect the dither fundamental in order to form the reference phase for nulling the second harmonic. This configuration is similar to quadrature bias control except that the nulling circuit is on the receiver and not the transmitter. The dither enables the receiver to more accurately cancel even order distortion even when the power in the two wavelengths are not well matched in the transmitter.

Obviously, many modifications and variations of the present invention are possible in light of the above teachings. For example, the principles of the present invention may also be applied to a single wavelength intensity modulated link as a means of low bias control when multiactive operation is not required. The second wavelength is simple filtered off before the transmit optical amplifier 52 in the transmitter. In this case, the receiver is a single photodetector with an optional optical preamplifier. The single wavelength link still has the sensitivity and third order SFDR improvements associated with low biasing. Low biased links are very sensitive to bias drift and this require active bias control. Low bias control without these two wavelength approachs is difficult to stabilize. Only the quadrature and minimum bias points are easily stabilized with a single wavelength and a single dither. Thus, it is to be understood that, within the scope of the appended claims, the invention may be practiced otherwise than as specifically described above.

We claim:

1. An optical system comprising:
   an optical transmitter, said optical transmitter including an optical modulator for modulating an RF input signal onto one or more optical carrier signals defining at least two wavelengths and providing RF modulated optical signals on one or more output ports and transmitting said RF modulated output signals available on said one or more output ports, said optical transmitter including a bias control circuit configured to operate optical modulator so that said at least two wavelength have relatively equal power but opposite slope;

an optical receiver for demodulating said multiple RF modulated optical signals and providing multiple RF output signals, said optical receiver including a control circuit having a wavelength division demultiplexer for demultiplexing said RF output signals and generating multiple optical signals at each of said multiple wavelengths, said control circuit also including a multiple photodetectors for converting said multiple optical signals to multiple electrical signals and a summing junction for subtracting said multiple electrical signals to provide an output signal; and an optical link connecting said optical transmitter and said optical receiver, wherein said optical link is in free space.

2. An optical system comprising:

an optical transmitter, said optical transmitter including an optical modulator for modulating RF input signals onto one or more optical carrier signals defining at least two wavelengths and generating RF modulated optical signals at one or more output ports and transmitting said RF modulated output signals over an optical link by way of said one or more output ports;

an optical demodulator for demodulating said RF modulated optical signals and providing RF output signals; and said optical link connecting said optical transmitter and said optical receiver, wherein said optical modulator is a Mach-Zehnder modulator includes an RF input port, a bias voltage input port, an optical carrier input port, and an optical output port, and wherein said optical receiver includes a circuit includes a wavelength division demultiplexer for demultiplexing said RF output signals and generating signals at each of said at least two wavelengths, said circuit also including a multiple photodetectors for converting said multiple optical signals to multiple electrical signals and a summing junction for subtracting said multiple electrical signals to provide output signals and wherein said optical transmitter includes a bias control circuit configured to operate optical modulator so that said at least two wavelengths have relatively equal power but opposite slope.

3. The optical system as recited in claim 2, wherein said optical transmitter includes a wavelength division multiplexer (WDM) and said one or more optical carrier signals having at least two wavelengths is formed from a plurality of carrier signals having different wavelengths for providing an optical carrier signal to said optical carrier input port of said Mach-Zehnder modulator, said optical transmitter also including a plurality of sources of carrier signals at different wavelengths which are applied to said WDM.

4. The optical system as recited in claim 2, wherein said optical receiver includes a wavelength division multiplexer (WDM) for receiving said RF modulated optical signal and demultiplexing said RF modulated optical signal into separate wavelength signals and a plurality of photodetectors coupled to said WDM for photodetecting the separate wavelength signals separately and generating corresponding multiple photodetector current signals, said optical receiver also including a summing junction for summing said photodetector currents.

5. The optical system as recited in claim 4, further including one or more optical amplifiers.

6. The optical system as recited in claim 5 wherein said one or more optical amplifiers are connected to one or the other of said optical transmitter and said optical receiver.

7. The optical system as recited in claim 6, including at least two optical amplifiers, one optical amplifier connected to said optical transmitter and one optical amplifier connected to said optical receiver.

* * * * *